(12) United States Patent
Knoll

(10) Patent No.: US 6,606,166 B1
(45) Date of Patent: Aug. 12, 2003

(54) PATTERN DITHERING

(75) Inventor: Thomas Knoll, Ann Arbor, MI (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/304,007

(22) Filed: Apr. 30, 1999

(51) Int. Cl.$^7$ ............................................... H04N 1/405
(52) U.S. Cl. ...................... 358/1.9; 358/3.13; 358/518; 382/167; 345/597
(58) Field of Search ....................... 358/1.9, 455, 456, 358/457, 534, 535, 518, 3.06, 3.13; 382/162, 167; 345/596, 597, 598, 599

(56) References Cited

U.S. PATENT DOCUMENTS

| | | | |
|---|---|---|---|
| 5,210,602 A | * 5/1993 | Mintzer | 358/518 |
| 5,319,742 A | * 6/1994 | Edgar | 345/597 |
| 5,341,464 A | * 8/1994 | Friedman et al. | 345/590 |
| 5,455,600 A | * 10/1995 | Friedman et al. | 345/597 |
| 5,664,080 A | * 9/1997 | Lucas et al. | 345/597 |
| 5,990,864 A | * 11/1999 | DeAguiar et al. | 345/600 |

OTHER PUBLICATIONS

Paul Woods, "Taming the Monsters of Web Imagery," Adobe Systems Incorporated, 1998.
"Adobe ImageReady: New Product Highlights", Adobe Systems Incorporated, Version 2, 1998.
"Adobe ImageReady:At A Glance", Adobe Systems Incorporated, Version 2, 1998.

* cited by examiner

*Primary Examiner*—Thomas D. Lee
(74) *Attorney, Agent, or Firm*—Fish & Richardson P.C.

(57) ABSTRACT

Generating a target image having a target palette from a source image. In general, in one aspect, a technique for generating from a source image a target image comprising target pixels having colors limited to colors found in a target palette includes: determining a source color of a region of the source image corresponding to a location of a target pixel; generating two or more candidate colors for the source color, where the candidate colors are in the target palette; selecting one candidate color from the two or more candidate colors; and setting a target color of the target pixel to be the selected candidate color.

48 Claims, 5 Drawing Sheets

PATTERN DITHERING

BACKGROUND

In computer graphics systems, each non-transparent pixel of an image has a color. A color can be expressed as a vector. For example, a color can be expressed as (57, 180, 200), corresponding to values for red, green, and blue, respectively. A color palette defines the colors available to the image. To display the image using a different color palette, the color of each pixel is converted from a color of the source color palette to a color of the target color palette. However, differences in the palettes and resolutions of the images can result in an undesirable target image, such as when source color values are not found in the target palette. Techniques have been developed to address target image quality by using patterns or random collections of colors from the target palette to emulate the source palette. These techniques are called "dithering" or "halftoning."

One conventional technique for dithering is noise dithering. In noise dithering, a noise function is applied to the source image to perturb the colors of the pixels. The resulting pixels are then mapped to the closest colors in the target palette. The noise function can be random or can use a recurring pattern. This approach is typically applied when the target palette has a high degree of structure and the colors are distributed in even steps. Applying this technique to a target palette consisting of only black and white is halftoning. One common structured target palette is a "web palette" used with images accessed through the World Wide Web. The typical web palette has 216 colors based on six steps in each of red, green, and blue.

Another conventional technique for dithering is error diffusion dithering. Starting with one source pixel, the color in the target palette closest to the color of the source pixel is assigned to the target pixel. An error value or difference between the source pixel and the target pixel is calculated and distributed to neighboring source pixels which have not yet been processed. This technique uses a sequential processing of pixels and is not well suited for parallel processing of pixels. For example, in one version of error diffusion dithering, when the source pixel color is 60% gray and the nearest color in the target palette is 50% gray, the remaining 10% gray (or a portion) is distributed to the neighboring unprocessed pixels. These neighboring pixels will be more likely to be expressed using darker colors in the target palette. Error from these neighboring pixels also propagates in a similar manner when they are processed.

SUMMARY

The invention provides methods and apparatus implementing techniques for generating a target image having a target palette from a source, image. In general, in one aspect, a technique for generating from a source image a target image comprising target pixels having colors limited to colors found in a target palette includes: determining a source color of a region of the source image corresponding to a location of a target pixel; generating two or more candidate colors for the source color, where the candidate colors are in the target palette; selecting one candidate color from the two or more candidate colors; and setting a target color of the target pixel to be the selected candidate color.

Advantages of implementations of the technique include one or more of the following: the target palette can have an arbitrary structure, where the distribution of colors is even or uneven (e.g., relatively dense in areas and relatively sparse in other areas); the color of a target pixel is determined independently of other target pixels and so avoids neighborhood effects of other target pixels; the color of a target pixel is determined statistically; for a target pixel at a particular location in the target image, the same target color is selected from the target palette for a particular source color, independent of the neighboring source colors; the selection of colors from the target palette reflects human perception of luminance and so provides a desirable target image.

DETAILED DESCRIPTION

Figure 1:
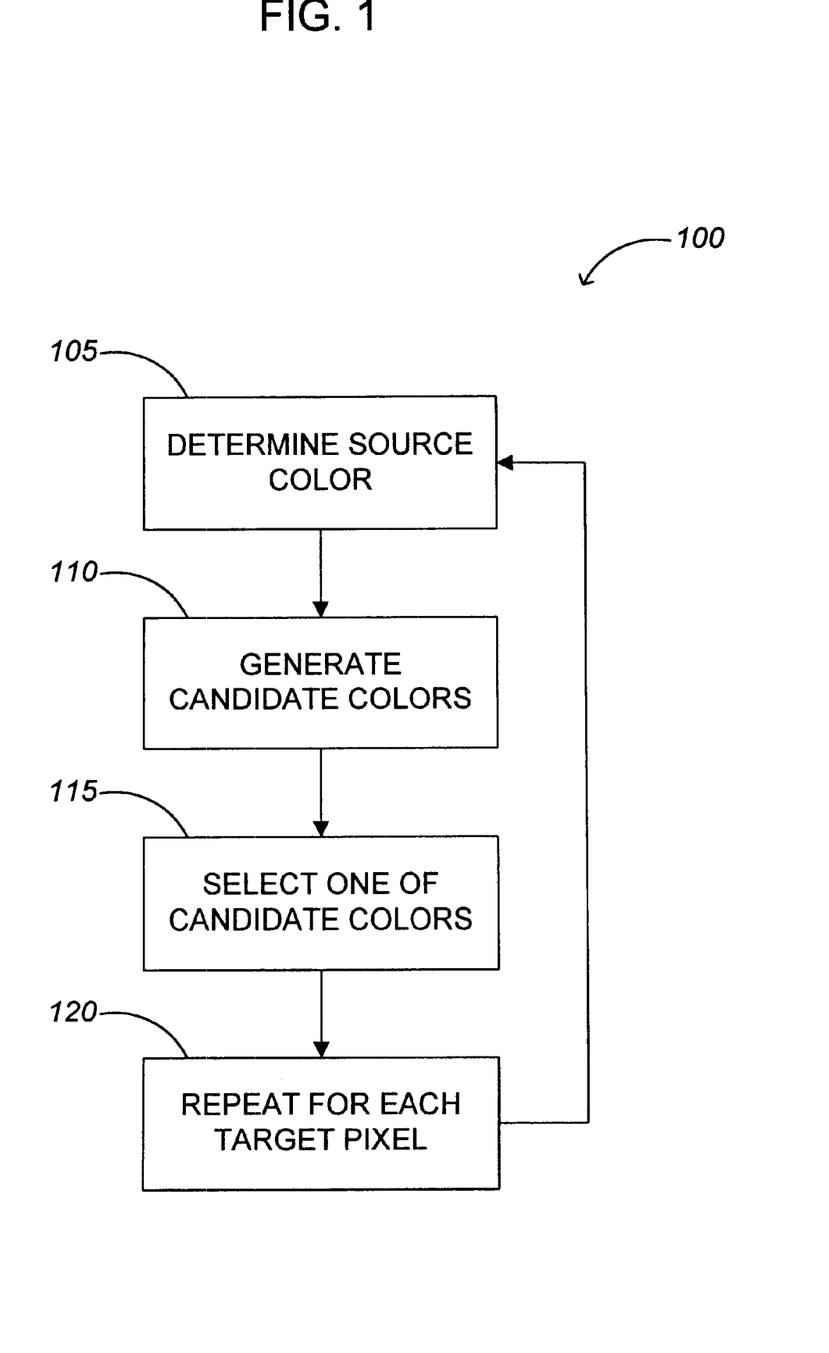
FIG. 1 is a flowchart of a process for generating a target image according to a technique of the invention.

As shown in FIG. 1, in a process 100 of generating a target image from a source image, for each target pixel in the target image, a system determines a source color in the source image and stores that color as a current source color (step 105). Each target pixel has a corresponding source color. When the number of target pixels is the same as the number of source pixels in the source image, each target pixel has a corresponding source pixel. In this case, the current source color is the color of the source pixel corresponding to the tar get pixel. If a source pixel does not have a color value, the system records that the corresponding target pixel also has no color value and proceeds to the next target pixel.

When the target image and the source image have different numbers of pixels, the system re-samples the source image to select a source color for the target pixel. When more than one source pixel corresponds to the target pixel, the system can interpolate or average, or both, colors of the corresponding source pixels to produce the source color. Alternatively, the system scales the source image to have the same number of pixels as the target image. The system can use conventional techniques for scaling the source image. After scaling, each of the source pixels in the scaled source image has a source color and coresponds to a respective target pixel.

Each target pixel is processed independently. The processing of one target pixel does not affect the processing of any other target pixel. The target color of each target pixel is determined independently of the other target pixels. Thus, the color of each target pixel is computed independently of the colors of neighboring target pixels. The system processes each target pixel once for a particular target image, such as sequentially. The system can process target pixels one at a time or in parallel.

The system generates one or more candidate colors in the target palette based upon the current source color (step 110). Generating candidate colors is described below and shown in FIGS. 3–5. The system can check whether the current source color matches a color in the target palette and record that color as the target color without generating candidate colors in the case of a match.

The system selects one of the candidate colors and stores that color as the target color of the target pixel (step 115). If any target pixels have not yet been assigned a target color, the system repeats the process 100 for an unprocessed target pixel (step 120). When all of the target pixels have an assigned target color, the target image is complete.

Figure 2A:
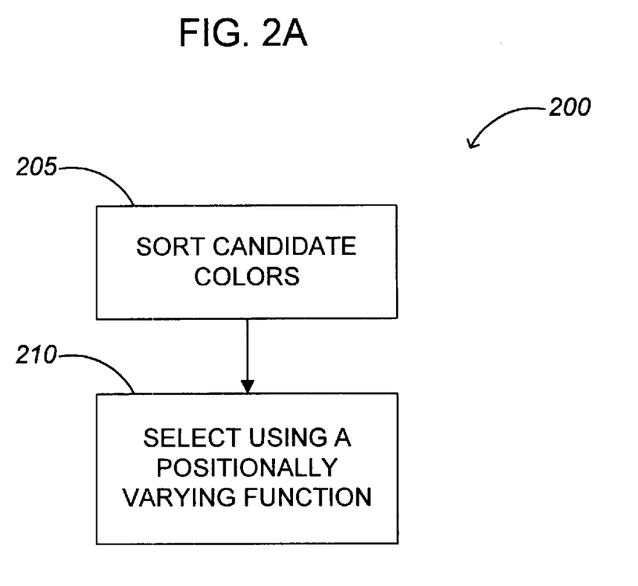
FIG. 2A is a flowchart of a process for selecting a candidate color according to a technique of the invention.

In one implementation, as shown in FIG. 2A, in a process 200 for selecting one of the candidate colors, the system sorts the candidate colors (step 205). The system sorts the candidate colors by luminance. In alternative implementations, the system sorts the candidate list using a different criterion or criteria. The system uses a dither ordering function to select one of the candidate colors, such as by selecting a pattern element indicating one of the candidate colors from a pattern (step 210). When the candidate colors are arranged in a list, the function indicates an index into that list to select one of the candidate colors. It is advantageous that the function be positionally varying, meaning that the value of the function depends on the position of the target pixel in the target image, and that the value of the function depends on nothing else.

Sorting the candidate colors by luminance is useful because the human eye is typically very sensitive to fine luminance detail. By operating on the candidate colors sorted by luminance, the function can control the distribution of light and dark colors among the target pixels. For example, in a local area of the target image, overly bright target pixels are near overly dark target pixels. The human eye perceives a smooth result by visually averaging the neighboring colors. When overly bright or dark pixels are grouped together, these pixels can create "clumping" artifacts which the eye can see as irregularities in the target image.

The function is advantageously a noise or pattern function. In one example of a noise function ("Noise [x, y]"), given a noise table ("NoiseTable") of random values and an offset table ("OffsetTable") of offsets into the NoiseTable, Noise [x, y] selects a value from the NoiseTable based on the (x, y) position of the target pixel as follows:

Noise [$x, y$]= NoiseTable [($x$+OffsetTable [$y$ MOD Length (Offset-Table)]) MOD Length (Noise Table)]

The noise function can, in effect, generate a very large pattern. In combination with a sorting of the candidate colors by luminance, it is advantageous for the noise function to have a bias against selecting adjacent candidates for adjacent target pixels. A blue noise function, which has a frequency bias toward higher frequencies, is one such advantageous function. Because of its bias, a blue noise function tends to place brighter pixels near darker pixels when applied to the candidate colors sorted by luminance.

In one example of a pattern function ("Pattern [x, y]"), given a pattern table ("PatternTable") of values in two dimensions, Pattern [x, y] selects a value from the Pattern Table based on the (x, y) position of the target pixel as follows:

Pattern [$x, y$]=PatternTable [$x$ MOD Width (PatternTable), $y$ MOD Height (PatternTable)]

For example, to select among 16 values for selecting one of 16 generated candidate colors, a 4×4 pattern can have a distribution such as:

0 8 2 10 12 4 14 6 3 11 1 9 15 7 13 5

This pattern forms a tile of 16 pixels which is in effect applied repeatedly to cover the target image. The location of the target pixel indicates an element in the pattern. This element in turn indicates one of the generated candidate colors. Like dither ordering functions generally, patterns are generally chosen so that every one of the candidate colors (counting duplicates separately) has an equal chance of being selected, although the pattern of selection may show a bias, as described above. The pattern shown above has a bias to select lighter and darker colors for particular relative positions in the target image to achieve a visually smooth result.

When the candidate color are sorted by luminance, the system can use the positionally varying function to select generally lighter colors at some target pixels and generally darker colors at others. These lighter and darker pixels can be distributed so as to achieve good visual uniformity.

Figure 2B:
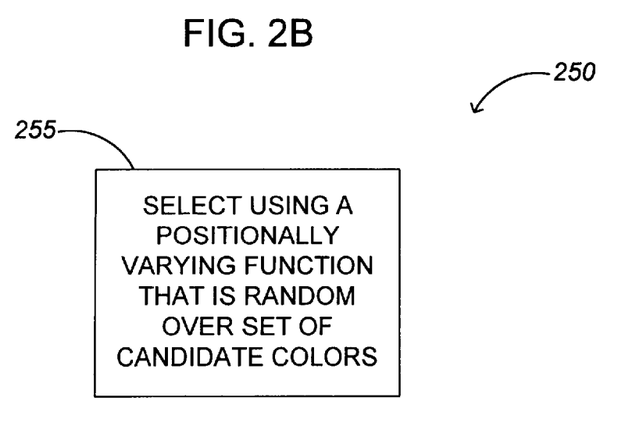
FIG. 2B is a flowchart of a process for selecting a candidate color according to a technique of the invention.

In another implementation, as shown in FIG. 2B, in a process 250 for selecting one of the candidate colors, the system selects one of the candidate colors using a dither ordering function that is random without any bias over the full set of candidate colors (step 255). In this case, the system does not sort the candidate colors.

Figure 3:
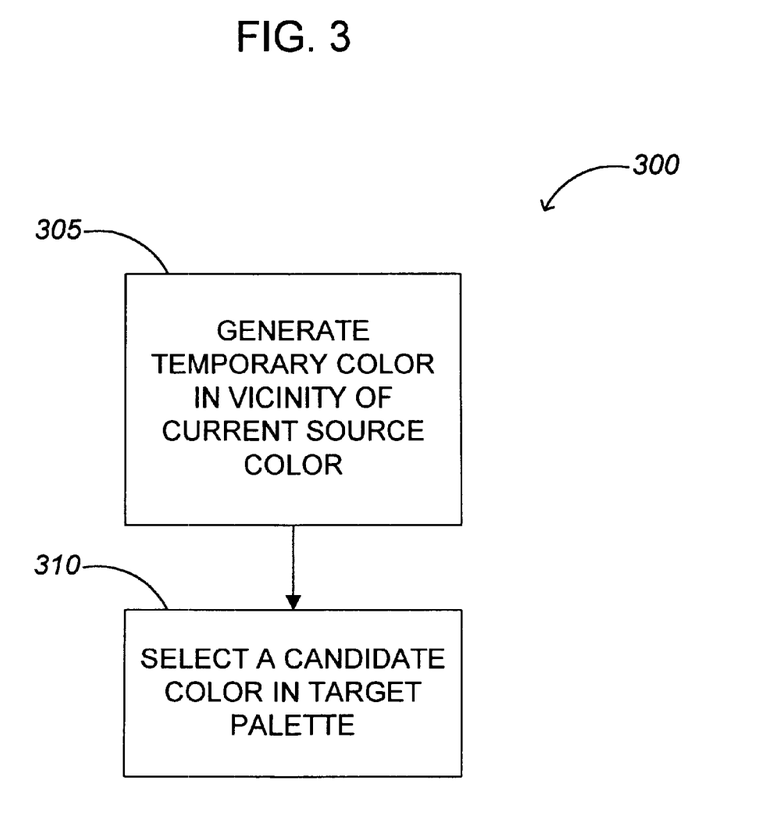
FIG. 3 is a flowchart of a process,for generating one or more candidate colors according to a technique of the invention.

As shown in FIG. 3, in a process 300 for generating one or more candidate colors, for each candidate color, the system generates a temporary color based on the current source color (step 305). The temporary color is generated to be in the vicinity of the current source color. The system selects a candidate color in the target palette by determining which color in the target palette is closest to the temporary color, as described below (step 310). Two or more of the candidate colors can be the same.

Figure 4:
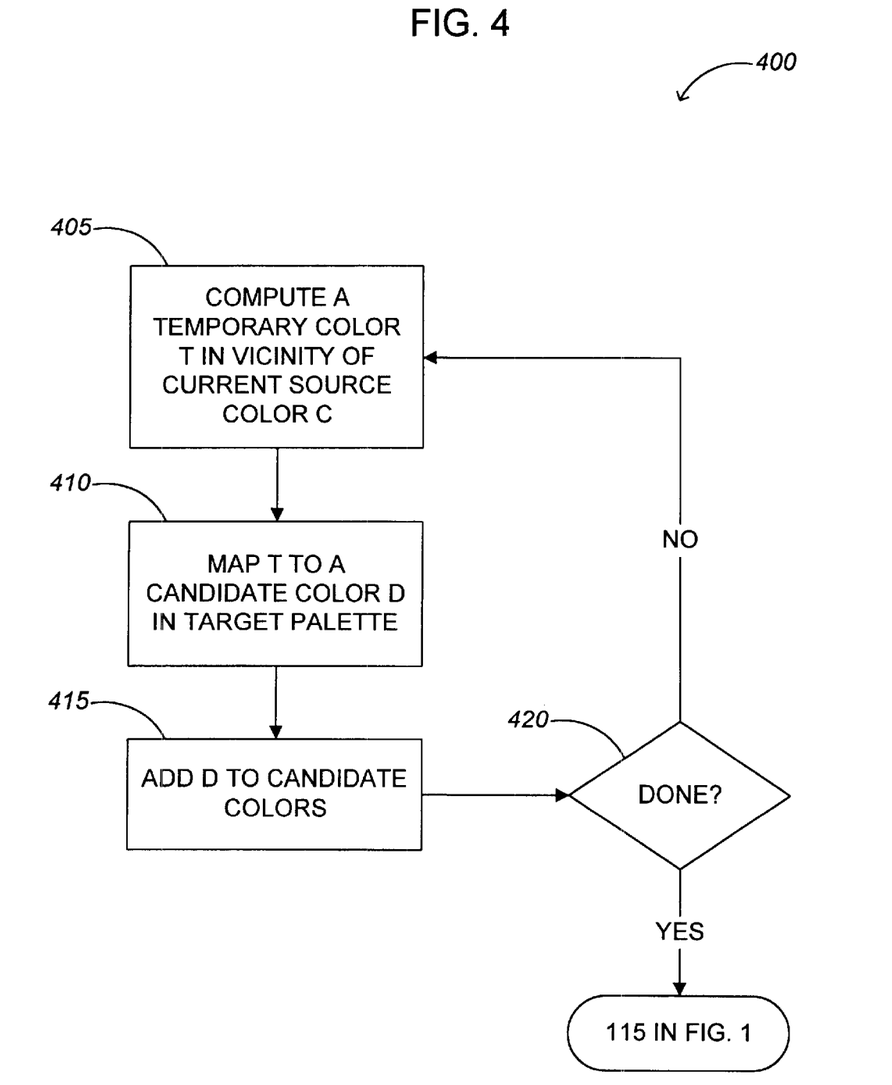
FIG. 4 is a flowchart of a process implementing the process of FIG. 3 for generating one or more candidate colors according to a technique of the invention.

FIG. 4 illustrates an implementation of the process 300 of FIG. 3. As shown in FIG. 4, in a process 400 for generating one or more candidate colors, the system computes a temporary color ("T") in the vicinity of the current source color ("C") (step 405). The system maps T to a candidate color ("D") in the target palette (step 410). The system selects as D the closest color in the target palette to the temporary color, as described below. The system adds D to the candidate colors (step 415). The number ("N") of candidate colors the system generates can be a predetermined value, such as N=16, or selected by a user of the system. Normally, the system generates the same number of candidate colors for each target pixel. If the system has generated N candidate colors (step 420), the system selects one of the candidate colors to be the target color (step 115), as described above. If the system has not yet generated N candidate colors, the system computes another temporary color (step 405).

Figure 5:
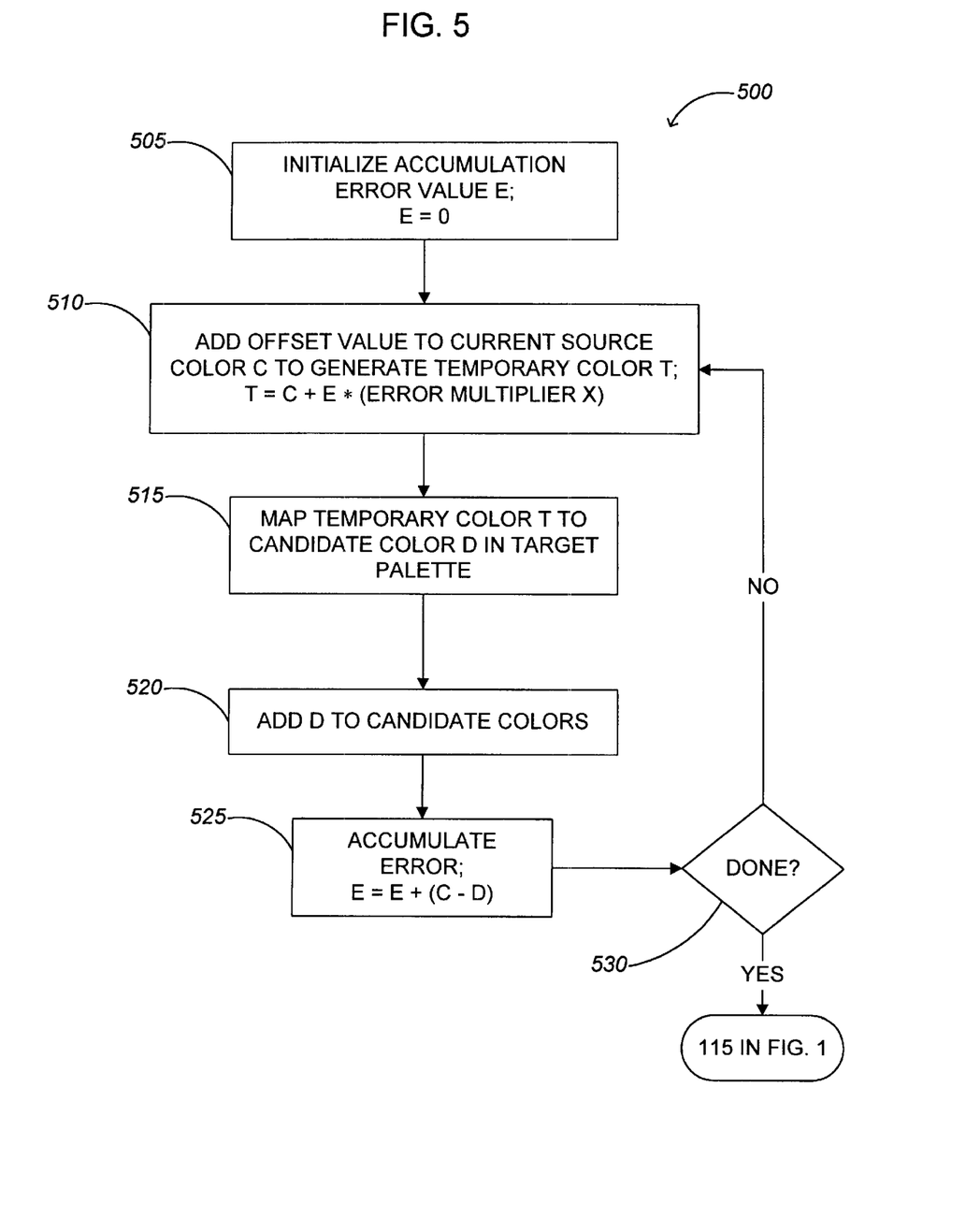
FIG. 5 is a flowchart of a process implementing the process of FIG. 4 for generating one or more candidate colors according to a technique of the invention.

FIG. 5 illustrates an implementation of the process 400 of FIG. 4. As shown in FIG. 5, in a process 500 for generating candidate colors, the system initializes an accumulation error value ("E") to zero (step 505). As described below, E is an accumulation of differences between the current source color C and candidate colors D.

The system adds an offset value ("O") to the current source color C and stores the result as a temporary color T, or T=C+O (step 510). The offset value O is equal to the product of the accumulation error value E and an error multiplier ("X"), or O=E×X. In general, O and E are vectors like the color vectors, and X is a scalar. The error multiplier X is a value between 0 and 1 and controls how far from the current source color C the system generates temporary colors to select candidate colors D. The error multiplier X is predetermined or can be selected by the user. Lower values produce less variation, possibly creating a posterized target image. Higher values can result in noisier Images.

The system then selects a candidate color D in the target palette that is closest (according to a chosen metric) to the temporary color T (step 515). The system can determine the closest color in various ways, such as by comparing Euclidean distances between the temporary color and colors in the target palette, or by making component-based computations. For example, when the temporary color and the target palette are in Commission Internationale de l'Eclairage ("CIE") L*a*b* color space, the system can use deltaE distances.

As an optimization, the system can use an inverse color table to reduce the number of comparisons. The inverse color table typically maps an input color in the source color space to a bin of colors in the target color space. Thus, in one implementation, colors in the bin for the temporary color are compared to the temporary color to find a closest or matching target color for the temporary color. When using an inverse color table, the resulting candidate color can be an approximation of the closest color in the target palette. The inverse color table can be supplied to the system or generated by the system.

In one implementation, the system selects a candidate color using colors in the target palette which average to a projection of the source color into the color space of the target palette. The system determines a basis set of colors in the target palette which enclose the source color in a three-dimensional color space, such as the target palette colors defining a minimum volume enclosing the projection. The source color can be expressed as a weighted average of the basis set colors. The system selects candidate colors from the basis set colors based on the weights each requires to average to the source color, such as in proportions approximately equal to the weights. If a basis set cannot be found for the projection of the source color, the system determines the point on the convex hull of the target palette colors that is closest to the source color and then finds a basis set for that color.

The system adds the candidate color D to the generated candidate colors (step 520). The system can store the candidate colors in a data structure such as a list or an array.

The system accumulates error by adding the difference between the current source color C and the candidate color D to the error value E, or E=E+(C−D) (step 525). For example, expressing colors as vectors, when C is (57, 180, 200) and D is (50, 170, 205), (C−D) is (7, 10, −5).

The system repeats the above steps 510 through 525 until the system has generated N candidate colors (step 530). After generating N candidate colors, the system selects one of the candidate colors to be the target color (step 115), as described above.

In one example of generating candidate colors, the current source color C is (57, 180, 200), the error multiplier X is 0.5, and N is 16. The system initializes the accumulation error value E to zero. For the first candidate color, the temporary color T is, (57, 180, 200) because E is zero and so the offset value O is zero (O=E×X). The system determines the closest color to T in the target palette, candidate color D. In this example, the resulting D is (50, 170, 205) (arbitrarily chosen in this example for illustrative purposes). The system records D as the first candidate color. The system adds the difference between C and D to E. The difference between C (57, 180, 200) and D (50, 170, 205) is (7, 10, −5), so E is (7, 10, −5). The system then proceeds to the second candidate color. The system calculates O to be (4, 5, −3) as the product of E (7, 10, −5) and X (0.5). The system sets T to be the sum of C (57, 180, 200) and O (4, 5, −3). Hence, T is (61, 185, 197). In this example, the system determines the closest color in the target palette to T is D (65 190, 205). The system stores D as the second candidate color. The system subtracts D (65, 190, 205) from C (57, 180, 200) and adds the resulting difference (−8, −10, −5) to E (7, 10, −5). The system stores the result (−1, 0, −10) as E and proceeds to the next candidate color. The system repeats these steps to generate 16 candidate colors.

In the above example, the current source color and the target palette are in the same color space. In this case, comparisons (e.g., determining the closest color) and calculations (e.g., adding E to C or subtracting D from C) can be made in one color space without conversion. The system can convert values outside the color space to within the color space (e.g., where an addition places a component of a color beyond the maximum, value). Alternatively, the system can use the values, recognizing the overflow or underflow. When the colors of the source image and the colors of the target palette are not in the same color space, the system can convert colors from one space to the other for these operations.

Alternatively, the system can convert colors to one or more additional color spaces optimal for operations for improved efficiency or improved image quality in the target image. The system can use color spaces to take advantage of linearity or perceptual uniformity in those spaces. For example, the system can use one color space (e.g., CIE XYZ) for calculations and another (e.g., CIE L*a*b*) for comparisons. The system can use one color space for both calculations and comparisons (e.g., CIE XYZ) to minimize the accumulation error value. The color space or spaces the system uses for these operations can be the same or different from the color spaces of either or both of the source image and the target palette.

In an alternative implementation, the system determines how many candidate colors to generate before generating any candidate colors. In this case, the system assigns the target pixel the last candidate color generated. The system uses the positionally varying function to generate an index ("n") from 1 to a maximum number N. The system generates n candidate colors, as described above. The nth candidate color is the target color.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way, of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

In one implementation, a computer system includes a processor, a random access memory (RAM), a program memory (for example, a writable read-only memory (ROM) such as a flash ROM), a hard drive controller, a video controller, and an input/output (I/O) controller coupled by a processor (CPU) bus. The system can be preprogrammed, in ROM, for example, or it can be programmed (and reprogrammed) by loading a program from another source (for example, from a floppy disk, a CD-ROM, or another computer). The hard drive controller is coupled to a hard disk suitable for storing executable computer programs, including programs embodying the present invention, and data including. The video controller is coupled to a video recorder, which can be used for storing and importing video footage and for writing final output. The I/O controller is coupled by means of an I/O bus to an I/O interface. The I/O interface receives and transmits data (e.g., stills, pictures, movies, and animations for importing into a composition) in analog or digital form over communication links such as a serial link, local area network, wireless link, and parallel link. Also coupled to the I/O bus is a display and a keyboard. Alternatively, separate connections (separate buses) can be used for the I/O interface, display and keyboard.

Numerous implementations of the invention have been described. However, these implementations are illustrative and additional variations are possible. For example, the number of candidate colors generated for each target pixel can vary. The system can select one of the candidate colors independent of the target pixel location, such as randomly. The target image can be for display on a display device such a computer monitor or for an imaging device, such as a printer. The system can convert across color spaces of different dimensions. Accordingly, the invention is not limited by the described implementations, but only by the following claims.

What is claimed is:

1. A method of generating from a source image a target image comprising target pixels having colors limited to colors found in a target palette, the method comprising:
   determining a source color of a region of the source image corresponding to a location of a target pixel;
   generating two or more candidate colors for a target color of the target pixel from the source color, where the two or more candidate colors are colors in the target palette;
   selecting one candidate color from the two or more candidate colors; and
   setting the target color of the target pixel to be the selected candidate color.

2. The method of claim 1, where:
   the source image comprises pixels each having a color;
   the target pixels and the pixels of the source image correspond one-to-one to each other;
   the region of the source image is a source image pixel corresponding to the target pixel; and
   the source color is the color of the corresponding source image pixel.

3. The method of claim 1, further comprising:
   determining how many candidate colors to generate;
   generating the candidate colors in sequence; and
   selecting the last generated candidate colors as the selected one candidate color.

4. The method of claim 1, further comprising:
   generating two or more temporary colors in the vicinity of the source color;
   computing a candidate color for each temporary color, where each candidate color is a color in the target palette closest to the respective temporary color;
   sorting the candidate colors by luminance; and
   selecting one candidate color based on the position of the target pixel in the target image.

5. The method of claim 4, where:
   the temporary colors are generated using a color space selected for linearity; and
   the candidate colors are computed using a color space selected for perceptual uniformity.

6. The method of claim 1, further comprising sorting the generated candidate colors.

7. The method of claim 6, where the candidate colors are sorted by luminance.

8. The method of claim 1, where the one candidate color is selected using a dither ordering function whose value depends only on the location of the target pixel in the target image.

9. The method of claim 8, where the dither ordering function is a noise function.

10. The method of claim 9, where the noise function is biased toward high-frequencies.

11. The method of claim 8, where the dither ordering function is a pattern function.

12. The method of claim 8, where the dither ordering function is random without bias over the generated candidate colors.

13. The method of claim 1, where generating two or more candidate colors comprises:
   generating a two or more temporary colors in the vicinity of the source color; and
   mapping the two or more temporary colors to the target palette to generate the two or more candidate colors.

14. The method of claim 13, where the mapping operates to select a color in the target palette closest to the temporary color.

15. The method of claim 14, where the closest color is determined with respect to a color space of the target palette.

16. The method of claim 14, where the closest color is determined in CIE L*a*b* color space.

17. The method of claim 1, where generating two or more candidate colors comprises:
   adding an offset value based on an accumulation error value to the source color to generate a temporary color;
   mapping the temporary color to the target palette to generate a candidate color;
   adding a difference between the source color and the candidate color to the accumulation error value; and repeating the above steps until all the candidate colors have been generated.

18. The method of claim 17, where the mapping is to a color in the target palette closest to the temporary color.

19. The method of claim 18, where the closest color is determined with respect to a color space of the target palette.

20. The method of claim 18, where the closest color is determined in CIE L*a*b* color space.

21. The method of claim 17, where the offset value is equal to the accumulation error value multiplied by an error multiplier.

22. The method of claim 21, where the error multiplier is a value between 0 and 1.

23. The method of claim 17, where the mapping comprises computing an approximation to a color in the target palette closest to the temporary color using an inverse color table.

24. The method of claim 1, where generating two or more candidate colors permits two or more of the candidate colors to be the same.

25. A method of generating from a source image a target image comprising target pixels having colors limited to colors found in a target palette, the method comprising:
   determining a source color of a region of the source image corresponding to a location of a target pixel;
   generating two or more temporary colors in the vicinity of the source color;
   computing a candidate color for each temporary color, where each candidate color is a color in the target palette closest to the respective temporary color;
   sorting the candidate colors; and
   selecting one candidate color for a target color of the target pixel based on the position of the target pixel in the target image.

26. The method of claim 25, where the target color for each target pixel is selected independently of the selection of the target color for any other target pixel.

27. The method of claim 25, where:
   the temporary colors are generated using a color space selected for linearity; and
   the candidate colors are computed using a color space selected for perceptual uniformity.

28. A method of generating from a source image a target image comprising target pixels having colors limited to colors found in a target palette, the method comprising:
   determining a source color of a region of the source image corresponding to a location of a target pixel;
   evaluating a function to calculate an integer value n in a range of integers 1 to N;
   using the source color to compute a sequence of N candidate colors, where each candidate color is a color in the target palette; and
   setting a target color of the target pixel to be the nth candidate color in the sequence of N candidate colors.

29. The method of claim 28, where:
   the source image comprises pixels each having a color;
   the target pixels and the pixels of the source image correspond one-to-one to each other;
   the region of the source image is a source image pixel corresponding to the target pixel;
   the source color is the color of the corresponding source image pixel; and
   the value of the function depends on the position of the target pixel in the target image.

30. The method of claim 29, where N is fixed at 16.

31. The method of claim 28, where the integer value n depends on the position of the target pixel in the target image, and where computing the sequence of N candidate colors comprises:
   generating a sequence of N temporary colors in the vicinity of the source color; and
   computing a candidate color for each temporary color, where each candidate color is a color in the target palette closest to the respective temporary color.

32. The method of claim 31, where:
   the temporary colors are generated using a color space selected for linearity; and
   the candidate colors are computed using a color space selected for perceptual uniformity.

33. A method of generating from a source image a target image comprising target pixels having colors limited to colors found in a target palette, the method comprising:
   determining a source color of a region of the source image corresponding to a location of a target pixel;
   generating two or more candidate colors for a target color of the target pixel from the source color, where the candidate colors are colors in the target palette, where any target palette color can occur more than once among the candidate colors, and where candidate colors are generated to have an average color close to the source color;
   determining a luminance value for each candidate color;
   applying a dither ordering function to select one candidate color from the two or more candidate colors, the dither ordering function operating to spread out luminance differences so that in any local area, overly bright pixels tend to be near overly dark pixels; and
   setting the target color of the target pixel to be the selected candidate color.

34. The method of claim 33, where applying a dither ordering function comprises:
   sorting the candidate colors in order by luminance;
   evaluating the dither ordering function to determine a position in the sorted order; and
   selecting the candidate color at the position in the sorted order determined by evaluating the dither ordering function as the selected candidate color.

35. The method of claim 34, where the dither ordering function is a noise function.

36. The method of claim 34, where the value of the dither ordering function depends only on the location of the target pixel the target image.

37. The method of claim 33, where generating two or more candidate colors comprises:
   selecting a basis set of colors from among the target palette colors close to the source color, the basis set enclosing the source color so that the source color can be expressed as a weighted average of the basis set colors; and
   generating as the candidate colors the basis set colors in proportions approximately equal to the weights required to produce the weighted average.

38. A system for generating a target image of target pixels having a target palette from a source image, comprising:
   means for determining a source color based on a location of a target pixel;
   means for generating two or more candidate colors for a target color of the target pixel from the source color, where the candidate colors are colors in the target palette;

means for selecting one candidate color; and means for setting a target color of the target pixel to be the selected candidate color.

39. The system of claim 38, further comprising:

means for generating two or more temporary colors in the vicinity of the source color;

means for computing a candidate color for each temporary color, where each candidate color is a color in the target palette closest to the respective temporary color;

means for sorting the candidate colors by luminance; and means for selecting one candidate color based on the position of the target pixel in the target image.

40. The system of claim 39, where:

the temporary colors are generated using a color space selected for linearity; and the candidate colors are computed using a color space selected for perceptual uniformity.

41. A computer program product stored on a computer-readable medium, for generating a target image of target pixels having a target palette from a source image, the computer program comprising instructions operable to cause a computer to:

determine a source color of a region of the source image corresponding to a location of a target pixel;

generate two or more candidate colors for a target color of the target pixel from the source color, where the candidate colors are colors in the target palette;

select one candidate color; and set the target color of the target pixel to be the selected candidate color.

42. The computer program product of claim 41, further comprising instructions operable to cause a computer to:

generate two or more temporary colors in the vicinity of the source color;

compute a candidate color for each temporary color, where each candidate color is a color in the target palette closest to the respective temporary color;

sort the candidate colors by luminance; and select one candidate color based on the position of the target pixel in the target image.

43. The computer program product of claim 42, further comprising instructions operable to cause a computer to:

generate the temporary colors using a color space selected for linearity; and compute the candidate colors using a color space selected for perceptual uniformity.

44. The computer program product of claim 41, wherein the instructions operable to cause a computer to select one candidate color include instructions operable to cause a computer to select the one candidate color using a dither ordering function whose value depends only on the location of the target pixel in the target image.

45. The computer program product of claim 41, wherein the instructions operable to cause a computer to generate two or more candidate colors include instructions operable to cause a computer to:

add an offset value based on an accumulation error value to the source color to generate a temporary color;

map the temporary color to the target palette to generate a candidate color;

add a difference between the source color and the candidate color to the accumulation error value; and repeat the above steps until all the candidate colors have been generated.

46. A computer program product stored on a computer-readable medium, for generating from a source image a target image comprising target pixels having colors limited to colors found in a target palette, the computer program product comprising instructions operable to cause a computer to:

determine a source color of a region of the source image corresponding to a location of a target pixel;

evaluate a function to calculate an integer value n in a range of integers 1 to N;

use the source color to compute a sequence of N candidate colors, where each candidate color is a color in the target palette; and set a target color of the target pixel to be the n'th candidate color in the sequence of N candidate colors.

47. The computer program product of claim 46, wherein the integer value n depends on the position of the target pixel in this target image, and wherein the instructions operable to cause a computer to use the source color to compute the sequence of N candidate colors include instructions operable to cause a computer to:

generate a sequence of N temporary colors in the vicinity of the source color; and compute a candidate color for each temporary color, where each candidate color is a color in the target palette closest to the respective temporary color.

48. A computer program product stored on a computer-readable medium, for generating from a source image a target image comprising target pixels having colors limited to colors found in a target palette, the computer program product comprising instructions operable to cause a computer to:

determine a source color of a region of the source image corresponding to a location of a target pixel;

generate two or more candidate colors for a target color of the target pixel from the source color, where the candidate colors are colors in the target palette, where any target palette color can occur more than once among the candidate colors, and where candidate colors are generated to have an average color close to the source color;

determine a luminance value for each candidate color;

apply a dither ordering function to select one candidate color from the two or more candidate colors, the dither ordering function operating to spread out luminance differences so that in any local area, overly bright pixels tend to be near overly dark pixels; and set the target color of the target pixel to be the selected candidate color.

* * * * *

UNITED STATES PATENT AND TRADEMARK OFFICE
CERTIFICATE OF CORRECTION

PATENT NO. : 6,606,166 B1
DATED : August 12, 2003
INVENTOR(S) : Thomas Knoll

It is certified that error appears in the above-identified patent and that said Letters Patent is hereby corrected as shown below:

Column 9,
Line 55, replace "$n^{th}$" with -- n'th --;

Column 10,
Line 49, insert -- in -- between "pixel" and "the".

Signed and Sealed this

Twentieth Day of April, 2004

JON W. DUDAS
*Acting Director of the United States Patent and Trademark Office*